United States Patent [19]
Rasch et al.

[11] Patent Number: 5,838,869
[45] Date of Patent: Nov. 17, 1998

[54] STRIP WAVEGUIDE AND USES THEREOF

[75] Inventors: Andreas Rasch; Matthias Rottschalk; Jens-Peter Ruske; Volker Groeber, all of Jena, Germany

[73] Assignee: LDT GmbH & Co. Laser-Display-Technologie KG, Gera, Germany

[21] Appl. No.: 718,352

[22] PCT Filed: Feb. 6, 1996

[86] PCT No.: PCT/EP96/00492

§ 371 Date: Oct. 3, 1996

§ 102(e) Date: Oct. 3, 1996

[87] PCT Pub. No.: WO96/24868

PCT Pub. Date: Aug. 15, 1996

[30] Foreign Application Priority Data

Feb. 7, 1995 [DE] Germany .......................... 195 03 931.9
Dec. 14, 1995 [DE] Germany .......................... 195 46 668.3

[51] Int. Cl.[6] ................................................. G02B 6/122
[52] U.S. Cl. ............................................................. 385/132
[58] Field of Search ........................... 385/129, 130, 385/132, 3

[56] References Cited

U.S. PATENT DOCUMENTS

| | | | |
|---|---|---|---|
| 4,707,058 | 11/1987 | Tolksdorf et al. | 385/129 |
| 4,746,183 | 5/1988 | Soref et al. | 385/14 |
| 4,834,480 | 5/1989 | Baker et al. | 385/132 |
| 4,904,039 | 2/1990 | Soref | 385/14 |
| 4,979,788 | 12/1990 | Brazas, Jr. | 385/14 |
| 5,064,265 | 11/1991 | Khanarian et al. | 385/141 |
| 5,276,745 | 1/1994 | Revelli, Jr. | 385/14 |
| 5,351,320 | 9/1994 | Kanetake et al. | 385/8 |
| 5,354,709 | 10/1994 | Lorenzo et al. | 385/130 |
| 5,381,426 | 1/1995 | Fontana et al. | 372/18 |

FOREIGN PATENT DOCUMENTS

| | | |
|---|---|---|
| 0 466 260 | 1/1992 | European Pat. Off. . |
| 3929340 | 1/1991 | Germany . |
| 41 28 846 | 3/1993 | Germany . |
| WO 94/20836 | 9/1994 | WIPO . |

OTHER PUBLICATIONS

"Fabrication and Characterization of Singlemode Channel Waveguides and . . . " Rottschalk, Ruske, Horning & Rasch, SPIE 2213, 1994, pp. 152–163.

"Integrierte Optik", Karthe, Müller & Jena, Akademische Verlagsgesellschaft Geest & Portig K.–G. Leipzig, 1991.

Fabrication and Characterization of Optical Waveguides in KTiOPO$_4$, Bierlein, Ferretti, Brixner & Hsu, Appl. Phys. Lett. 50(18), Mar. 4, 1987, pp. 1216–1218.

XP000568115, Proceedings of the Spie, vol. 2213, Jan. 1994, pp. 152–163, Article "Fabrication and Characterization of Singlemode Channel Waveguides and Modulators in KT10P04 for the Short Visible Wavelenght Region" / Rottschalk, et al.

XP002003795, Applied Optics, vol. 16, No. 1, Jan. 1977, pp. 113–118, Article "Mode Dispersion in Diffused Channel Waveguides By the Effective Index Method" / Hocker, et al.

XP002003796, Applied Physics letters, vol. 50, No. 18, May 1987, pp. 1216–1218, "Fabrication and Characterization of Optical Waveguides in KTiOPO4" / Bierlin, et al.

*Primary Examiner*—John D. Lee
*Assistant Examiner*—Ellen E. Kang
*Attorney, Agent, or Firm*—McAulay Nissen Goldberg Kiel & Hand, LLP

[57] ABSTRACT

The invention concerns an integrated-optical channel waveguide and its applications as switch, modulator, and sensor. The channel waveguide is placed into or onto the flat substrate material and features a geometrically narrowly delimited channel-shaped structure, where the delimitation is located vertical to the propagation direction of the light. A single-mode integrated-optical wideband channel waveguide is described which is capable of guiding, e.g., light from the entire visible wavelength range in single-mode and effectively, that is, at low optical attenuation, and which thus represents a real single-mode white light channel waveguide. If required, the light can be switched and modulated, wavelength-dependent, or wavelength-independent, e.g. by electro-optical techniques. The channel waveguide is fabricated by means of basically known processes, e.g. by changing the refractive index.

8 Claims, 8 Drawing Sheets

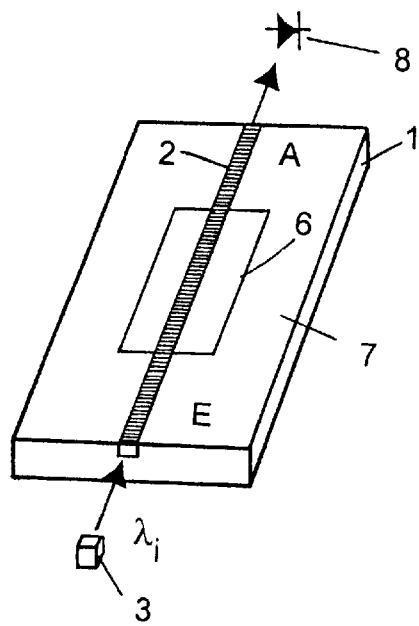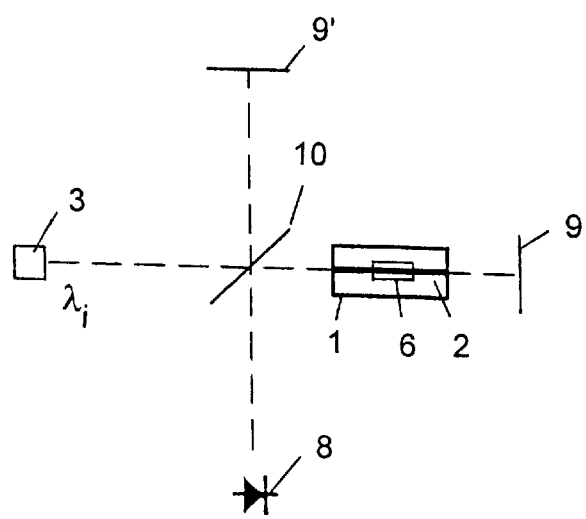
FIG. 8a
FIG. 8b
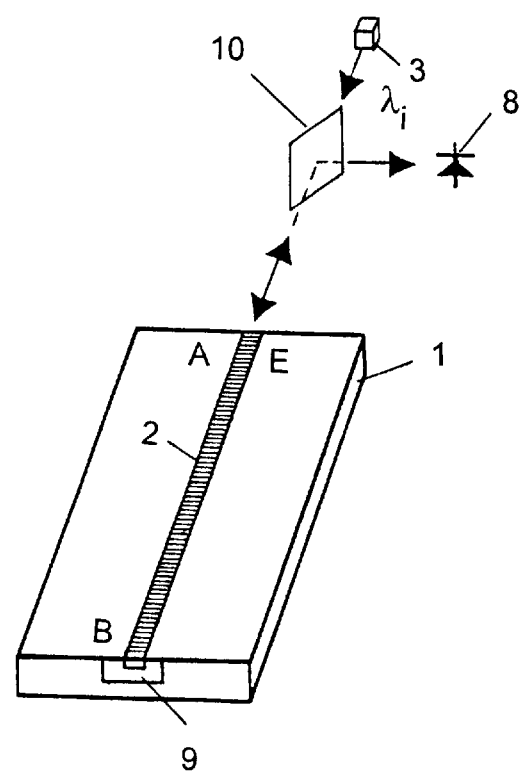
FIG. 8c

STRIP WAVEGUIDE AND USES THEREOF

BACKGROUND OF THE INVENTION

1. Field of the Invention

This invention concerns an integrated-optical channel waveguide. The new characteristics of the channel waveguide open up new application areas which require modulation or switching and/or spatially integrating light components of differing wavelengths and/or at least one wavelength range. The invention is related to the patent applications "Junction Splitters consisting of Channel Waveguides and Applications", and "Colour Image Generation Systems and Applications" submitted on the same day

2. Description of the Related Art

One of the principal procedures, which has become established in integrated optics for dimensioning integrated-optical channel waveguides and devices based on them, is to select in some suitable fashion the geometric and substance parameters of the channel waveguide as appropriate for a definite wavelength given by the application aim. Due to the given facts prevailing in optical telecommunications technology, in particular the transmission characteristics of standardized single-mode and multimode fibers, substrate materials presently available, and waveguide manufacturing technologies, and the limits of structure transfer processes (e.g. photo-lithography), the interest in integrated optics has so far almost exclusively concentrated on applications for wavelengths in the infrared spectrum Against this background, it had so far not been necessary in integrated optics to investigate an optical bandwidth within the meaning of the definition given in this description, namely the wavelength range within which the light will be simultaneously guided in single-mode and efficiently along a channel waveguide. In the entire literature on integrated optics, neither has there been an investigation of a channel waveguide with regard to this subject, nor is there a description of the effective refractive index of the guided mode as a function of the wavelength. Thus, neither theoretical calculations regarding this subject have been published so far nor have channel waveguides been proposed, fabricated or investigated whose optical bandwidth defined above comprises a wavelength range of e.g. 400 nm—in particular, however, the entire visible wavelength spectrum.

For transmission, modulation, and/or switching of light by means of integrated-optical devices, it is necessary to fabricate optical fibre waveguides whose function is based on the increase of the refractive index in the waveguiding region; e.g. channel waveguides or optical fibres (in: W. Kaithe, R. Müller, *Integrierte Optik* (*Integrated Optics*), *Akademische Verlagsgesellschaft Geest & Portig K.-G., Leipzig*, 1991). Another option for light transmission and light modulation is offered by quasi-waveguides, e.g. ARROW (in: M. Mann, U. Tritschel, C. Wächter, L. Leine, F. Lederer *"Directional coupler based on an antiresonant reflecting optical waveguide"*, *Opt. Lett.*, Vol. 16(1991), No. 11, pp. 805–807). For effective modulation and/or switching of light, it is advantageous if waveguides only guide the fundamental mode. Different light wavelengths thus require different values for the characteristic waveguide parameters, which in general require the use of different waveguides for different light wavelengths. Single-mode optical fibres, on the other hand, have the known characteristic to transmit, in single-mode and effectively, light within a wide spectrum range. To date, however, no channel waveguide in or on a substrate material is known, that is characterized by guiding light of differing wavelengths, which wavelengths differ by more than approximately 130 nm (value applicable to visible light only), in one and the same channel waveguide—in single-mode and with sufficient efficiency from a technical point of view.

OBJECT AND SUMMARY OF THE INVENTION

This present invention is based on the task to guide in single-mode light of several wavelengths or wavelength ranges in one and the same channel waveguide. And the light waves carried in the channel waveguide should allow switching or modulation, if desired. For a wavelength difference greater than approximately 130 nm (value applicable to visible light only), the radiation of different wavelengths should still allow, from a technical point of view, a sufficiently effective transmission. Furthermore, sensors with new characteristics are to be developed.

The task of the invention is solved by a channel waveguide comprising a channel waveguide comprising a surface substrate material and a channel-shaped structure fabricated in or on said substrate material by a process for changing the refractive index or by applying a suitable material for providing a channel waveguide having geometric/substance parameters. The parameters are set in dependence of wavelength ranges to be transmitted in the UW, visible and/or IR regions, so that in relation to wavelength ($\lambda$) the minimum width of the wavelength range for single-mode light guidance is provided by the equation $$\Delta\lambda = 0.48 \times \lambda - 85 \text{ nm}$$

(with $\lambda$ and $\Delta\lambda$ being stated in nm) is ensured. That is, to each given wavelength ($\lambda$) in the range between $\lambda_1$ and $\lambda_1 + \Delta\lambda$ one and only one refractive index, i.e. the effective refractive index of the fundamental node ($N_{00}$), can be allocated. Further, the single-mode range will be determined by the efficient oscillation build-up, from a technical point of view, of fundamental mode $N_{00}$ at wavelength $\lambda_1 + \Delta\lambda$ on the one hand, and by the efficient oscillation build-up, from a technical point of view, of the first mode in lateral direction ($N_{01}$) or of the first mode in depth direction ($N_{10}$) at wavelength $\lambda_1$ on the other. With transmission thereof at a technically sufficient degree of effectiveness signifying that the effective refractive index $N_{eff}$ of the mode guided in the channel waveguide must be at least $5 \times 10^{-5}$ above the refractive index of the surrounding material $n_s$, where $n_s$ designates the value of the substrate index $n_1$ or the superstrate $n_3$, whichever is higher, and with the minimum possible value of the usable wavelength ($\lambda_{min}$) and the maximum possible value of the usable wavelength ($\lambda_{max}$) being determined by the transmission range of the materials used. The channel waveguide is defined as a single-mode integrated-optical wideband channel waveguide (SOWCW).

The task of the invention in respect of switching and modulation is solved for example, by a method of using a SOWCW as at least one of a wavelength-selective optical wideband switch and wideband modulator for influencing at least one of amplitude or intensity, phase and polarization of the light in the SOWCW, based on a principle selected from a group of principles consisting of: electro-optical modulation, acousto-optical modulation, thermo-optical modulation, magneto-optical modulation, opto-optical modulation, photothermal modulation, change of effective refractive index by injection or depletion of free charge carriers in semiconductor materials, electro-optical, acousto-optical, thermo-optical, magneto-optical, opto-optical, or photothermal modulation utilizing the Fabry-Perot effect, modulation by changing the effective refractive index by injection or depletion of free charge carriers in semiconductor materials, utilizing the Fabry-Perot effect, electro-optical, acousto-optical, thermo-optical, magneto-optical, opto-optical, or photothermal cut-off modulation, cut-off modulation due to change in the effective refractive index by injection or depletion of free charge carriers in semiconductor materials, controllable waveguide amplification, controllable polarization conversion, waveguide mode conversion, or where the wavelength-selective switching or light modulation is effected outside the SOWCW by at least one of: a phase shifter (e.g., Pockels cell), and polarization converters as external devices The invention lies in the successful fabrication of a channel with the following characteristics: single-mode, and narrowly delimited two-dimensionally vertical to the direction of propagation of the light; where this channel also features the characteristic of transmitting light using relatively wide bandwidths. Two-dimensionally narrowly delimited signifies that a channel can be fabricated which represents the waveguiding structure as a groove cut into the substrate or as a waveguide strip applied onto the substrate, which structure features a narrowly delimited cross-sectional shape. This cross-sectional shape can take any form, in particular the form of strips, or rectangular, triangular, circular, elliptic, or polygonal forms.

The groove, or the applied strip, will be implemented by a specific modification of a suitable substrate material or a combination of at least two materials. The processes required in this respect are basically known. Wide-band transmission of light is favored if the dispersion of the refractive index increase required for guiding, $d(n_2-n_s)/d\lambda$ is greater or equal zero.

Furthermore, it was also found that even a waveguide with a channel that is not narrowly delimited features the characteristic of transmitting light at a comparatively wide bandwidth, if only the dispersion of the refractive index increase required for guiding, $d(n_2-n_s)/d\lambda$ is greater or equal zero.

In each case, there is a single-mode integrated-optical wide-band channel waveguide, hereinafter referred to as SOWCW, which is capable of wide bandwidth and single-mode light transmission. Wide bandwidth signifies that the radiation of different wavelengths, in particular of the visible light spectrum, with a bandwidth of $$\Delta\lambda > 0.48 \times \lambda - 85 \; nm$$

(where $\lambda$ and $\Delta\lambda$ are stated in nm) can be transmitted in single-mode with a technically sufficient degree of effectiveness. For visible light, this means a bandwidth greater than approximately 100 nm (FIG. 7b). Single-mode means that for each given wavelength within a wavelength range one and only one effective refractive index can be allocated (FIG. 7a).

Light is understood here as meaning visible and invisible, that is infrared and ultraviolet electromagnetic radiation. Transmission with a technically sufficient degree of effectiveness means that the effective refractive index $N_{eff}$ of the mode guided in the SOWCW must be at least $5 \times 10^{-5}$ above the refractive index of the surrounding material $n_s$, where $n_s$ designates the value of the substrate index $n_1$ or the value of the superstrate index $n_3$—whichever is higher. This is a necessary precondition for achieving low values of waveguide attenuation in the range 1 dB/cm and implementing a channel waveguide such that it can be used efficiently in technical applications.

For each given wavelength in the range between $\lambda_1$ and $\lambda_1+\Delta\lambda$, one and only one effective refractive index, that is the effective refractive index of the fundamental mode $N_{00}$, can be allocated. The single-mode range is determined on the one hand by the efficient oscillation build-up, from a technical point of view, of the fundamental mode $N_{00}$ at wavelength $\lambda_1+\Delta\lambda$, and on the other hand by the efficient oscillation build-up, from a technical point of view, of the first mode in a lateral direction $N_{01}$ or the first mode in depth direction $N_{10}$ at wavelength $\lambda_1$. The values of $\lambda_1$ and $\lambda_1+\Delta\lambda$ are determined by the geometric/substance parameters of the channel waveguide and the media surrounding the channel waveguide. In principle, the minimum value of the usable wavelength $\lambda_{min}$ and the maximum value of the usable wavelength $\lambda_{max}$ are determined by the transmission range of the materials used.

For the crystal material $KTiOPO_4$, for example, the minimum value is approximately 350 nm and the maximum value approximately 4 $\mu$m.

Technically effective signifies furthermore that, in the entire single-mode guidable wavelength range, waveguide attenuation and the efficiency of the optical coupling between the SOWCW and a single-mode optical fibre should not change by more than 30%, as light is usually coupled into the SOWCW by means of single-mode optical fibres. Using standard channel waveguides, it is not possible to guide e.g. red and blue light in one and the same channel waveguide in single-mode and with a technically sufficient degree of effectiveness. The parameters substrate refractive index, superstrate refractive index, refractive index or one- or two-dimensional refractive index profile of the SOWCW, cross-sectional shape (width and depth, for example) and the location of the SOWCW in or on the substrate are dimensioned such that across a wide wavelength range of $\Delta\lambda > 130$ nm (value applicable for visible light only) single-mode operation of the SOWCW is ensured, i.e. to a given wavelength within this range, one and only one effective refractive index can be allocated respectively (in: W. Karthe, R. M üller, *Integrated Optics, Akademische Verlagsgesellschaft Geest & Portig K.-G., Leipzig,* 1991).

In particular, light waves of the entire visible wavelength spectrum can be guided. Such light wave guidance in one and the same SOWCW across the entire visible spectrum will be in single-mode and, from a technical point of view, of the same effectiveness. Thus, this is a real single-mode white light channel waveguide.

The SOWCW according to this invention are characterized by the specifically adapted processes for their fabrication and by their specific characteristics. The physical requirements in relation to the substrate material are: production of narrowly delimited structures in a lateral direction (e.g. by making use of a diffusion anisotropy during ion exchange), and/or a dispersion of the refractive index increase necessary for wave guidance in relation to the material surrounding the SOWCW according to the following formula:

$$\frac{d(n_2 - n_s)}{d\lambda} \geq 0,$$

where $n_s=n_1$, if $n_1>n_3$ or $n_s=n_3$, if $n_3>n_1$.

The SOWCW is produced according to one of the following processes:

ion exchange or ion indiffusion in dielectric crystals such as $KTiOPO_4$ (KTP), $LiNbO_3$, and $LiTaO_3$, ion exchange in glass, injection molding, stamping or centrifugal processes with polymers on suitable substrates such as Si, this will produce rib or inverted rib or Petermann waveguides, SOWCW in II-VI or III-V semiconductor materials, fabricated by epitaxial depositing processes on suitable substrates such as $SiO_2$ for use in the infrared wavelength spectrum, SOWCW in II-VI or III-V semiconductor materials, fabricated by doping or alloying for use in the infrared wavelength spectrum, SOWCW in heterostructures of ternary or quaternary II-VI or III-V semiconductor materials, Rib or inverted rib or Petermann waveguides in II-VI or III-V semiconductor materials, SOWCW in and on a suitable substrate material, preferably Si, by combining Si, $SiO_2$, SiON layers, and/or other oxidic and/or nitride layers.

Sol-Gel processes on suitable substrate materials (S. Pelli, G. C. Righini, A. Verciani: *"Laser writing of optical waveguides in sol-gel films"*, SPIE 2213, *International Symposium on Integrated Optics*, pp. 58–63, 1994), ion implantation in all above-mentioned materials.

The processes ion exchange and ion indiffusion in dielectric crystals, or ion exchange in glass, can be combined advantageously with the ion implantation process to obtain narrowly delimited structures.

The SOWCW according to the invention allows lightwave guidance, light modulation, and/or light switching within a wide spectrum range.

The modulation of the phase, amplitude, and/or polarization of light is effected in the SOWCW according to one of the following principles:

electro-optical, acoustooptical, thermooptical, magnetooptical, optooptical, or photothermal modulation, changing the effective refractive index by injection or depletion of free charge carriers in semiconductor materials, electro-optical, acoustooptical, thermooptical, magnetooptical, optooptical, or photothermal modulation, utilizing the Fabry-Perot effect, modulation by changing the effective refractive index by injection or depletion of free charge carriers in semiconductor materials, utilizing the Fabry-Perot effect, electro-optical, acoustooptical, thermooptical, magnetooptical, optooptical, or photothenmal cut-off modulation, cut-off modulation by changing the effective refractive index by injection or depletion of free charge carriers in semiconductor materials, controllable waveguide amplification, controllable polarization conversion, waveguide mode conversion, or electro-absorption modulation.

Light modulation can also be effected outside the SOWCW; by means of:

changing the coupling effectiveness between light source and channel waveguide, or modulation of the light source itself, or further light weakeners (e.g. wedge filter), or phase shifters (e.g. Pockels cell), or polarization converters as external devices.

The light modulation in the SOWCW can be effected in the phase, amplitude, and the polarization direction. An external electric field $E_{elektr}$ has an influence on the refractive index of the substrate material—as well as, in good approximation, on the effective refractive index of the guided mode—, according to the following formula $$\Delta \frac{|1|}{\left| n \frac{2}{ij} \right|} = \sum_{k=1}^{3} r_{ijk} E_k$$

with the refractive index of the material $n_{ij}$, the linear electro-optical tensor $r_{ijk}$ and i,j=1,2,3.

By activation of the relevant tensor components, either the refractive index of the material itself and/or the double refraction of the material can be changed. For a given linear light polarization, $n_{ij}$ will be reduced to the active refractive index n. Phase modulation signifies that the phase of the guided mode is changed by changing its propagation constants—i.e. its effective refractive index $N_{eff}$—in relation to wavelengths, according to the following formula $$\Delta\phi = \frac{2\pi}{\lambda} (\Delta Neff) L$$

where L designates the length over which the electric field acts on the SOWCW, which in general is the active electrode length. In addition, the following applies in the channel waveguide $$\Delta n \approx \Delta Neff.$$

Amplitude modulation or intensity modulation in the SOWCW signify either cut-off modulation or modulation using an integrated-optical Fabry-Perot resonator. Cut-off modulation signifies that the refractive index increase $n_2-n_s$, necessary for wave guidance is reduced such that the attenuation of the waveguide mode increases strongly, and, in extreme cases, it is no longer possible for any waveguide mode to propagate. Thus the intensity of the light at the light output of the SOWCW can be set to a value between zero and a maximum. Polarization modulation signifies that a double refraction change induced by the above-mentioned effect will cause a change in the polarization state of the guided light. With all types of modulation mentioned here, the channel waveguide does not lose its characteristic to guide wavelengths from a wide spectrum range in single-mode.

If the above-stated principles are utilized, light across the entire spectrum of visible light can be guided and modulated in single-mode by a single SOWCW. If the SOWCW is appropriately dimensioned, simultaneous guidance in single-mode of electromagnetic radiation in several wavelengths or wavelength ranges within a range of $\Delta\lambda > 0.48 \times \lambda - 85$ nm becomes also possible in other spectrum ranges, e.g. in the ultraviolet or infrared wavelength spectrum; the aforementioned range will be limited by the transmission range of the materials used. The SOWCW characteristics allow applications, e.g., for the purposes of measurement technology, sensorics, photometry, and spectroscopy, e.g. by making use of a interferometric processes, providing the basis for a new microsystem-technical device family.

The SOWCW according to the invention offers the following advantages:

single-mode wideband transmission of light;

within the technical meaning, effective light modulation and/or switching capability into the GHz range (according to the current state of the art);

depending on requirements, it is possible to select a wavelength-dependent modulation arrangement, or a modulation arrangement independent of wavelength (e.g. electro-absorption modulation, light source modulation, wedge filter);

low electro-optical modulation voltages (some volts) in comparison to Pockels or Kerr cells (some 100 volts), thus good combination possibilities with processes, structures, and devices in microelectronics;

when using KTP as a substrate material, high optical performance densities can be guided in the SOWCW without any interfering phase alterations (high resistance of the material against a light-induced alteration of the refractive index).

Integrated-optical wideband channel waveguides for the entire visible wavelength spectrum represent a basic innovation in integrated optics, making possible a class of completely new solutions in principle, e.g. in the multimedia sector, in sensorics, in measurement technology, and spectroscopy.

BRIEF DESCRIPTION OF THE DRAWINGS

Below, the invention will be described by means of figures. These show:

FIG. 8: sensor applications of the SOWCW.

DESCRIPTION OF THE PREFERRED EMBODIMENTS

Figure 1:
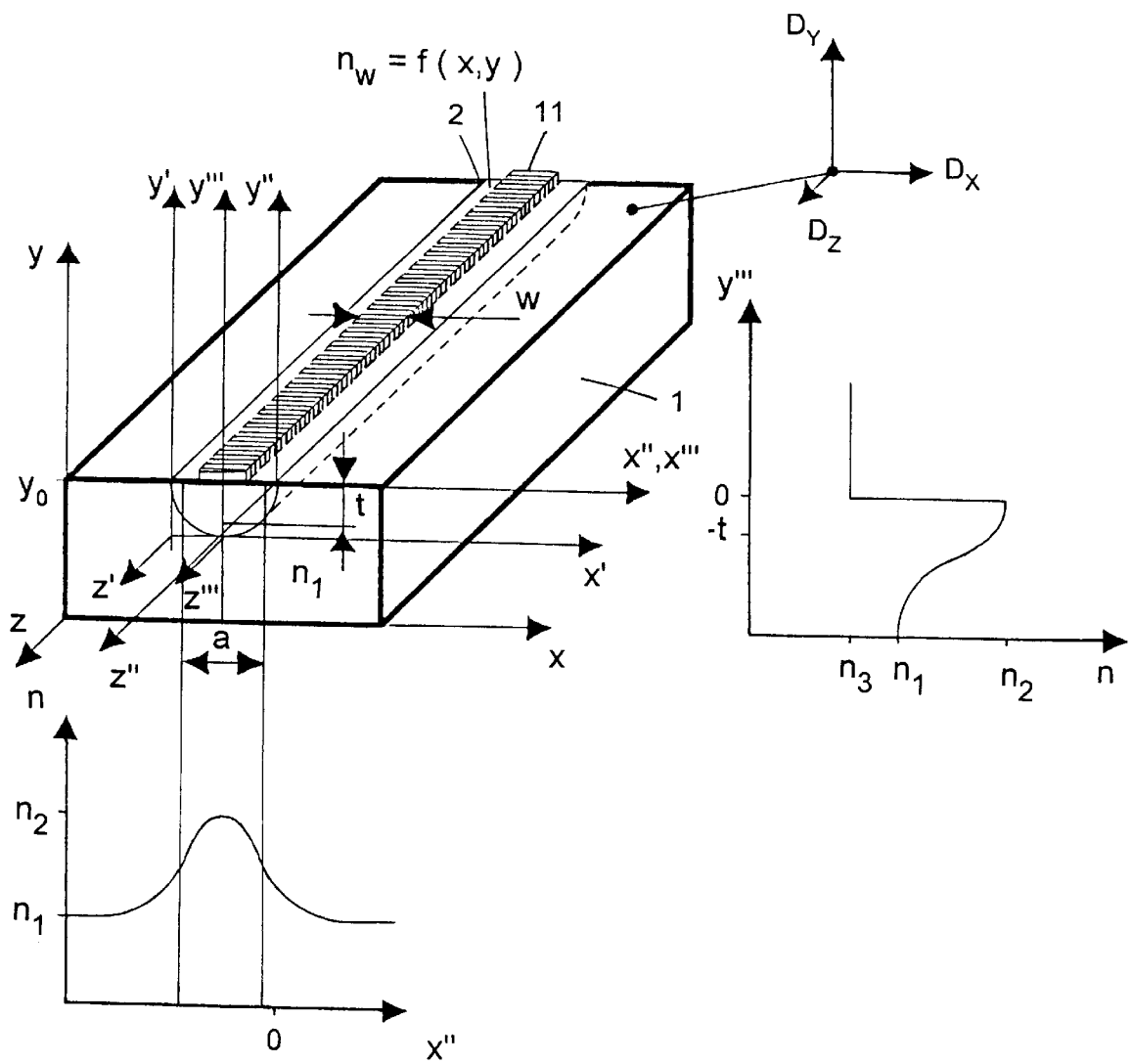
FIG. 1: illustration of the structure and the course of the refractive index in a Ti:LiNbO$_3$ channel waveguide.
Figure 2:
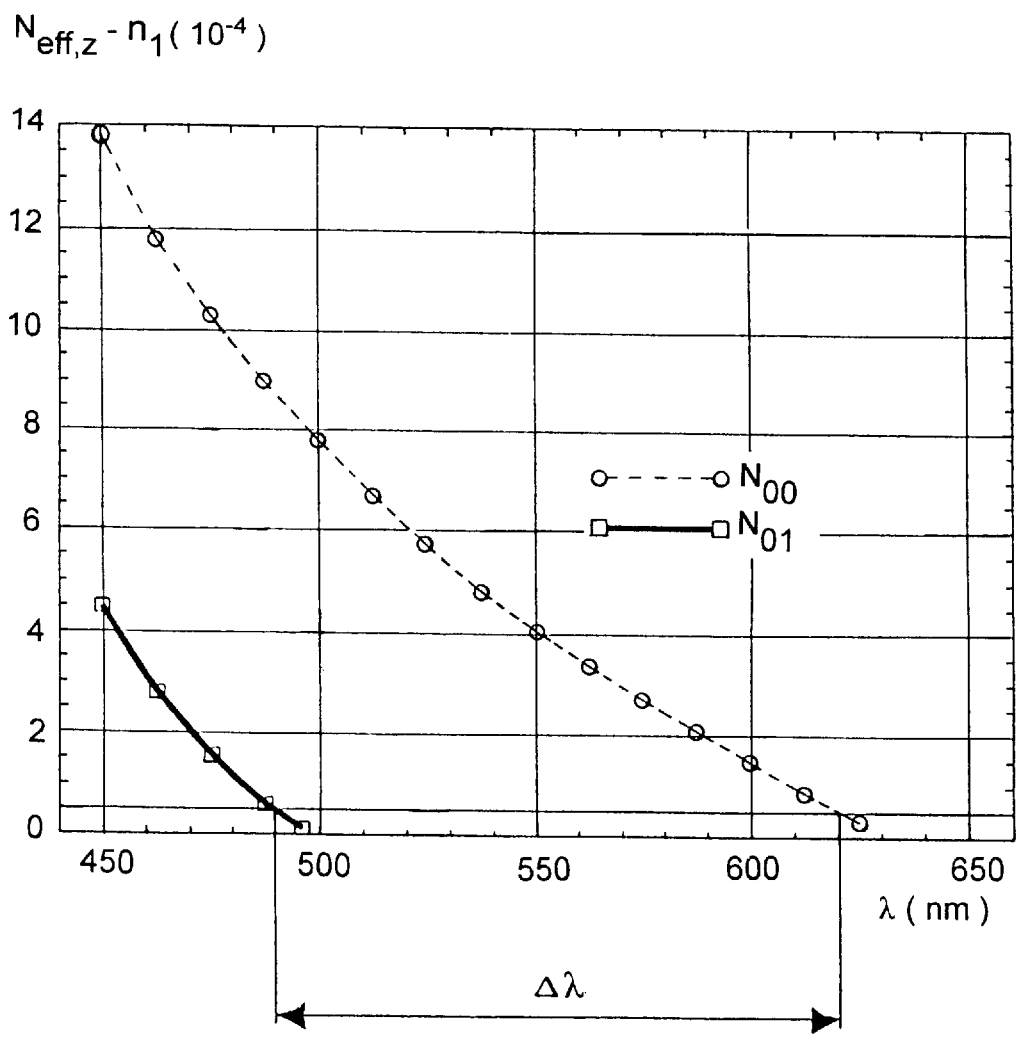
FIG. 2: single-mode range of the Ti: LiNbO$_3$ channel waveguide.

The characteristics of a known titanium-indiffused channel waveguide in LiNbO$_3$ are illustrated in FIG. 1 and in FIG. 2. This is contrasted with the characteristics of a single-mode integrated-optical wideband channel waveguide (SOWCW), according to this invention, which characteristics are illustrated in respect of the bandwidth of this waveguide, using a rubidium←→potassium ion exchanged channel waveguide in KTP, in FIG. 3 and FIG. 4. In FIG. 2, as well as in FIG. 4, the illustration type selected is the effective refractive index $N_{eff,Z}$ in relation to the value of the refractive index of substrate n, as a function of wavelength λ. Each waveguide mode can be allocated an effective refractive index $N_{eff}$ between $n_2$ and $n_1$ or $n_3$, whichever is the higher value. The value of $N_{eff}$ depends on the wavelength, the substrate and waveguide refractive indices, or the substrate and waveguide refractive index profiles, and the waveguide geometry. Each mode with index ik (i, k≧0, integer) will thus be illustrated in the diagram by means of its effective refractive index as a line $N_{ik}$, where i symbolizes the order of the depth modes, and k the order of the lateral modes.

Figure 7A:
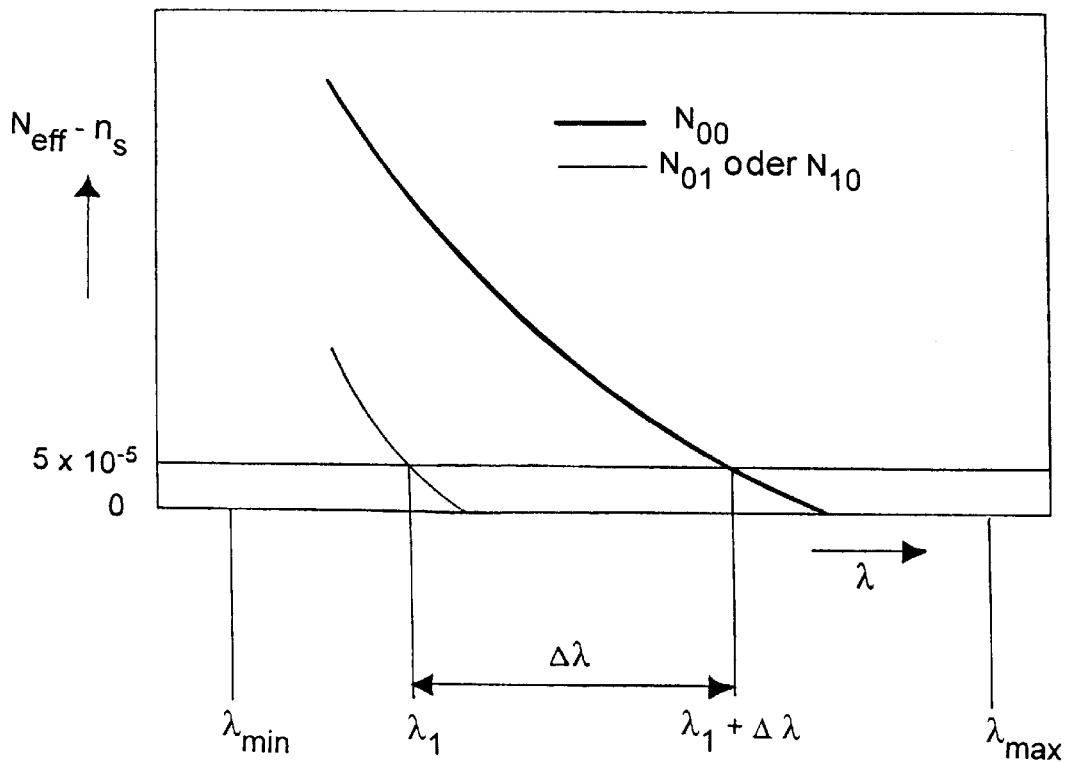
FIG. 7: general illustration of the technically relevant wavelength range for single-mode wave guidance in an SOWCW.
Figure 7B:
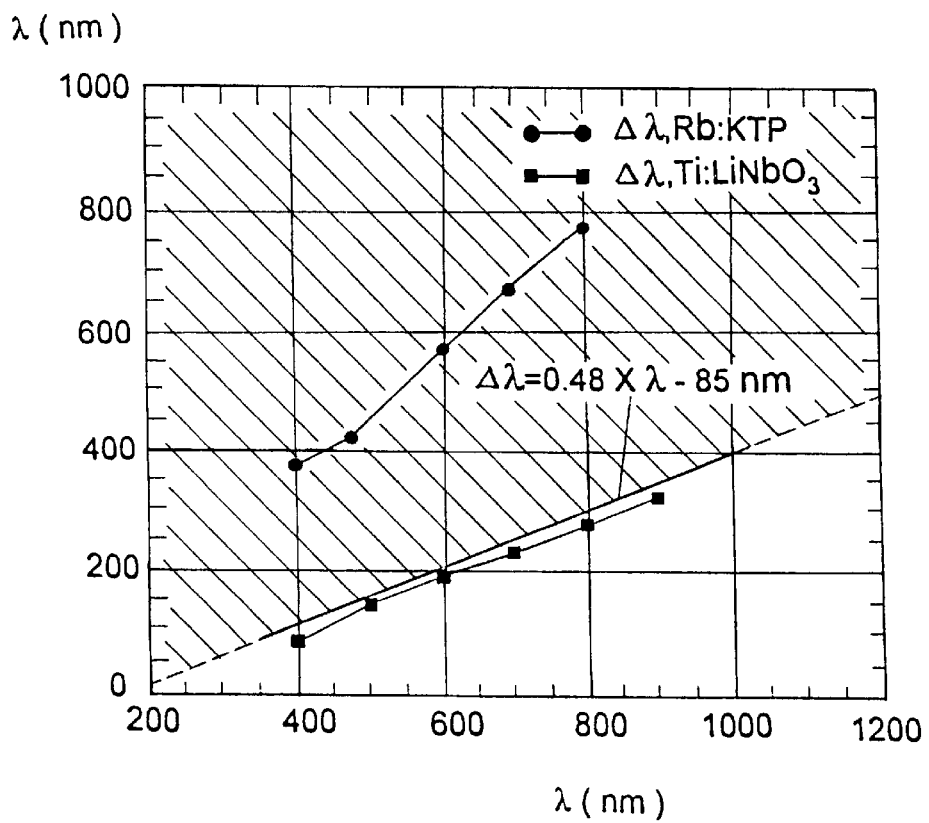

The waveguide is single-mode, if, for a given wavelength from a wavelength range, one and only one effective refractive index can be allocated. For sufficient guiding of the light, from a technical point of view, the effective refractive index of the relevant mode must be at least $5 \times 10^{-5}$ above $n_1$ and/or $n_3$. The bandwidth can thus be read off directly. FIG. 7a is a generalized description of the single-mode efficiently guidable wavelength range in the channel waveguide (from a technical point of view). FIG. 7b shows the single-mode guidable wavelength range for an SOWCW according to the invention in KTP, as well as a standard titanium-indiffused channel waveguide in LiNbO$_3$, in direct dependence of the wavelength itself. In addition, in FIG. 7b the area of the SOWCW according to this invention will be delimited in general from current state-of-the-art channel waveguides.

FIGS. 1 and 2 provide initial descriptions using the example of a titanium-indiffused channel waveguide.

FIG. 1 shows a channel waveguide 2 in a substrate material 1. To fabricate the standard channel waveguide, in this example a titanium-indiffusion will be carried out in X-cut lithium niobate (LiNbO$_3$) (R. V. Schmidt, I. P. Kaminow, *Appl. Phys. Lett.*, Vol 25 (1974), No. 8, pp. 458–460). To this end, a titanium strip 11 is sputtered onto the substrate surface. At temperatures higher than 950° C., the titanium will diffuse into the crystal. In lateral direction, the diffusion constant is approximately twice as high as in depth direction, that is why the strip widens very considerably. Following the diffusion time period $t_d$, and for an initial strip width w, the refractive index profile obtains a shape described by the formulae below. Titanium-indiffused channel waveguides are not capable of guiding light with a bandwith of several 100 nm in the visible light wavelength spectrum in single-mode (cf. FIG. 7b). The waveguide 2 is provided as a groove, not to any great extent geometrically delimited, with the width a and the depth t. The groove has a refractive index distribution $n_w=f(x,y)$, with a surface refractive index $n_2=n_w$ (x'''=0, y'''=0), which is increased in relation to the refractive index $n_1$ of the surrounding substrate material. The diagrams in FIG. 1 show the qualitative course of the refractive index in x direction and in y direction. The steady transition of the refractive index course in x direction (direction x" is actually shown here) and in y direction (direction y''' is actually shown here) is typical.

FIG. 2 shows the single-mode range in a titanium-indiffused channel waveguide in X-cut LiNbO$_3$ (X=crystallographic X axis, corresponds to y axis in FIG. 1), selected as an example. The graphs represent the effective refractive index for Z-polarized light ($N_{eff, Z}$, Z=crystallographic Z axis, corresponds to x axis in FIG. 1) of the fundamental mode $N_{00}$ and the first mode in lateral direction $N_{01}$. A w=3.0 μm wide, 15 nm thick sputtered titanium strip is used as a diffusion source. The diffusion temperature is 1000° C., diffusion time will be 3 hours.

The ratio of the titanium-ion diffusion constants in the LiNbO$_3$ is $$D_x/D_y \approx 2.$$

The depth profile is calculated as follows $$n_w = n_1 + (n_2 - n_1) * exp(-(y''')^2/a_y^2),$$

the lateral refractive index profile is calculated as follows $$n_w = n_1 + (n_2 - n_1) * 0.5 \, [erf((2x'''+w)/2a_x) - erf((2x'''-w)/2a_x)],$$

where $$a_x = 2(D_x t_d)^{1/2},$$

and corresponds to width a/2 in FIG. 1, furthermore $$a_y = 2(D_y t_d)^{1/2}$$

and corresponds to depth t in FIG. 1 and amounts to 2 μm. At λ=500 nm, $n_1$=2.2492; $n_2-n_1$=0.0080; the dispersion of the substrate index $n_1$ is less than zero. The value $t_d$ represents diffusion time, erf the error function (cf. J. Ctyroky, M. Hofnan, J. Janta, J. Schröfel, "3-D Analysis of LiNbO₃: Ti Channel Waveguides and Directional Couplers", IEEE J. of Quanturm Electron., Vol QE-20 (1984), No. 4, pp. 400–409). The channel waveguide described here guides in the range 490 nm to 620 nm—in a technically efficient sense—the fundamental mode only, i.e. the bandwidth will be Δλ=130 nm. The effective refractive indices were calculated using the effective index method (G. B. Hocker, W. K. Burns "Mode dispersion in diffused channel waveguides by the effective index method", Appl. Optics, Vol. 16 (1977), No. 1, pp. 113–118).

Figure 3:
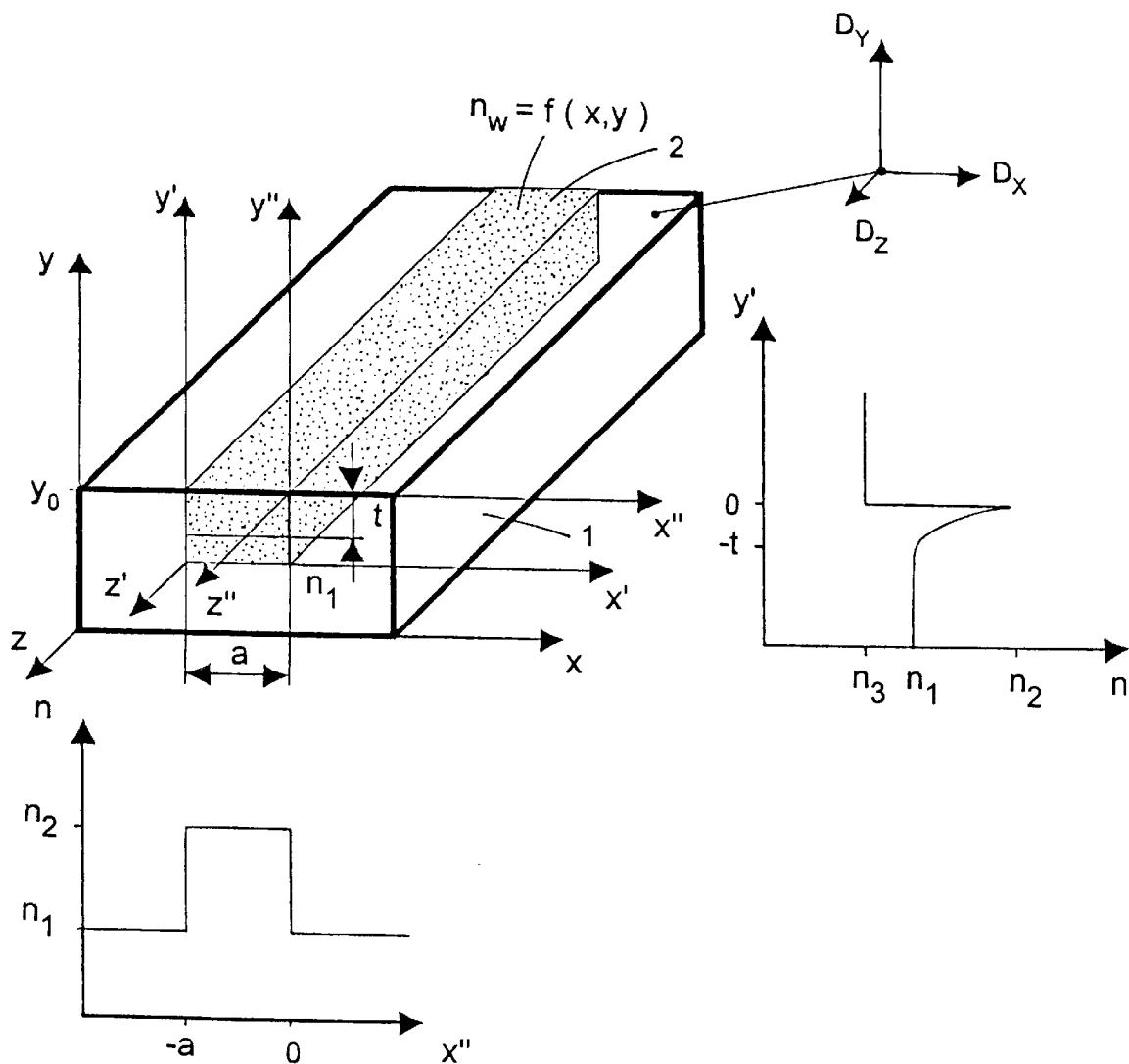
FIG. 3: illustration of the structure and the course of the refractive index in a Rb:KTP-SOWCW.

FIG. 3 shows the single-mode integrated-optical wideband channel waveguide (SOWCW) 2, according to this invention, in substrate material 1: in this example, Z-cut KTiOPO₄ (KTP). (M. Rottschalk, J.-P. Ruske, K. Hornig, A. Rascb, "Fabrication and Characterization of Singlemode Channel Waveguides and Modulators in KTiOPO₄ for the Short Visible Wavelength Region", SPIE 2213, International Symposium on Integrated Optics (1994) pp. 152–163). The substrate material 1 will be provided with a mask leaving a gap open at the future waveguide location only. The rubidium-potassium ion exchange will be effected in a melt of rubidium nitrate complete with barium nitrate and potassium nitrate components. A diffusion is predominantly effected in depth direction only, with the refractive index profile forming which is described below. In a lateral direction, there follows a step profile of the refractive index. The fabrication of sharply delimited narrow structures is ensured as the transmission from the mask into the waveguide occurs at the ratio of 1:1 due to almost complete lack of a side diffusion.

The dispersion in the Rb:KTP waveguide is $d(n_2-n_1)/d\lambda \geq 0$. This dispersion favors the single-mode characteristic of the waveguide within a comparatively wide wavelength range Δλ. This SOWCW 2 is single-mode across a wavelength range of approx. 400 nm. The SOWCW 2 is provided as a groove, sharply delimited geometrically, with the width a and the depth t. The groove has a refractive index distribution $n_w$=f(x,y), with a surface refractive index $n_2=n_w$ (-a≦x"≦0, y"=0), which is increased in relation to the refractive index $n_1$ of the surrounding substrate material.

The diagrams in FIG. 3 show the qualitative course of the refractive index in x direction and in y direction. The steep jump of the refractive index course in x direction (direction x" is actually shown here), and the comparatively high increase of the refractive index from $n_1$ to $n_2$ in y direction (direction y' is actually shown here), are typical.

Figure 4:
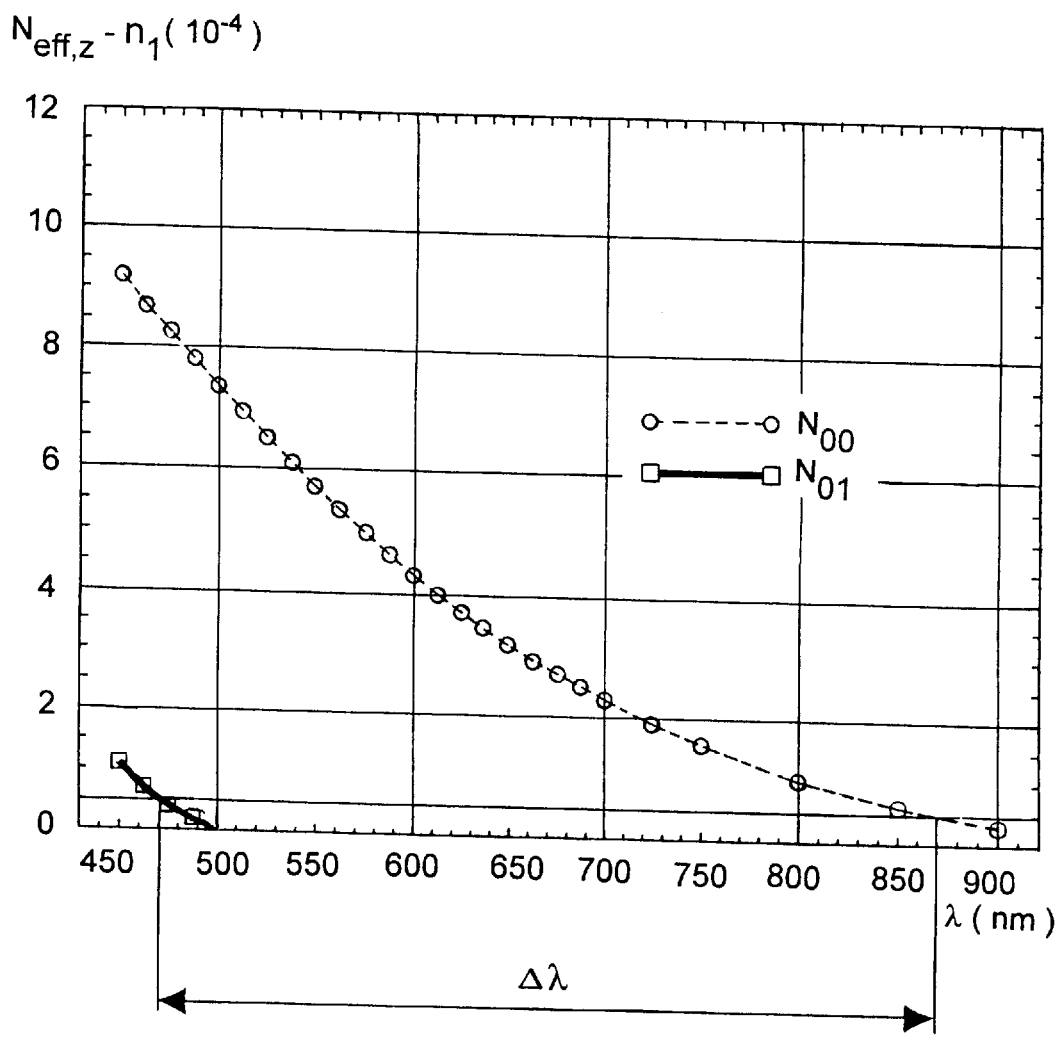
FIG. 4: single-mode range of the Rb:KTP-SOWCW.

FIG. 4 shows the characteristics of a selected rubidium-potassium ion-exchanged SOWCW in KTiOPO₄ according to this invention. The graphs represent the effective refractive index for Z-polarized light ($N_{eff,Z}$, Z=crystallographic Z axis, corresponds to y axis in FIG. 3) of the fundamental mode $N_{00}$ and the 1st mode in lateral direction $N_{01}$. At λ=500 nm, $n_1$=1.9010; the dispersion of the substrate index $n_1$ is less than zero (described in: L. P. Shi, Application of crystals of the KTiOPO₄-type in the field of integrated optics, Dissertation Univ. Cologne (1992)). The effective refractive indices were calculated using the effective index method. Furthermore, $n_2-n_1$=0.0037=const. applies to the entire wavelength range.

For the diffusion constants, the following holds $$D_x/D_y \approx 10^{-3}.$$

The lateral refractive index profile is a step profile (cf. FIG. 3) with the width a=4.0 μm. The depth profile is calculated as follows $$n_w = n_1 + (n_2-n_1) * erfc(-y''/t)$$

where t=4.0 μm, erfc=complementary error function. The SOWCW described in this example guides—in a technically efficient sense, and within the range 470 nm to 870 nm,—the fundamental mode only, that is, the bandwidth is Δλ=400 nm. Fabrication of the SOWCW described in the example is basically known. The waveguide is fabricated in a Z-cut potassium titanyl phosphate substrate material (KTiOPO₄, KTP) by ion-exchanging the rubidium for potassium. (J. D. Bierlein, A. Ferretti, L. H. Brixner, W. Y. Hsu, "Fabrication and characterization of optical waveguides in KTiOPO₄", Appl Phys. Lett., Vol. 50 (1987), No. 8, pp. 1216–1218). Z-cut signifies that the crystal level in which the waveguide is generated lies in a vertical direction to the crystallographic Z axis. Here, the fact is utilized that the diffusion during ion-exchange mainly occurs in depth direction. (J. D. Bierlein, H Vanherzeele, "Potassium titanyl phosphate: properties and new applications", J. Opt. Soc. Am. B, Vol. 6 (1989), No. 4, pp. 622–633).

Figure 5A:
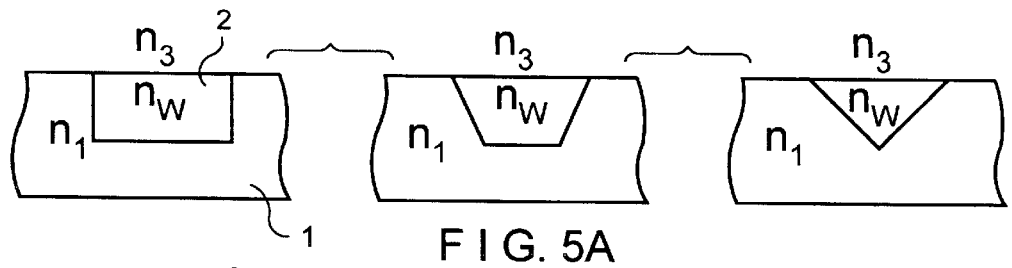
FIG. 5: arrangements of the SOWCW in or on the substrate material and cross-sectional shapes of the waveguiding ranges.
Figure 5B:
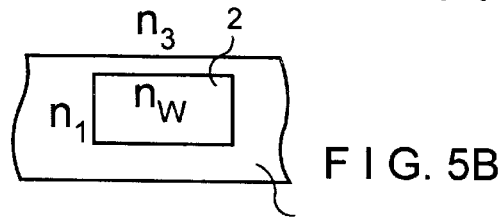
Figure 5C:
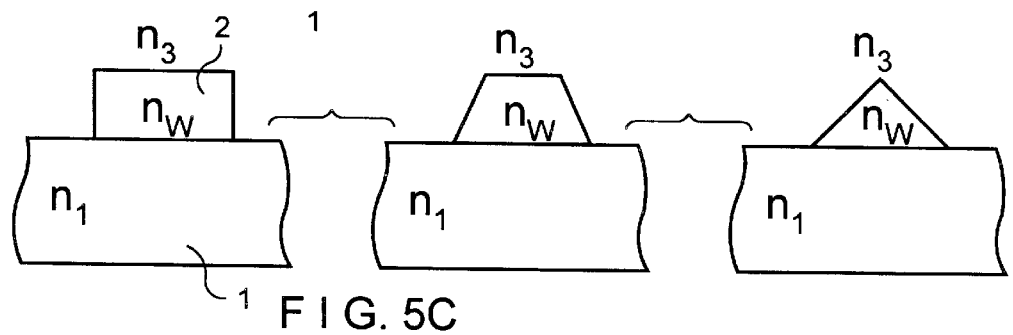
Figure 5D:
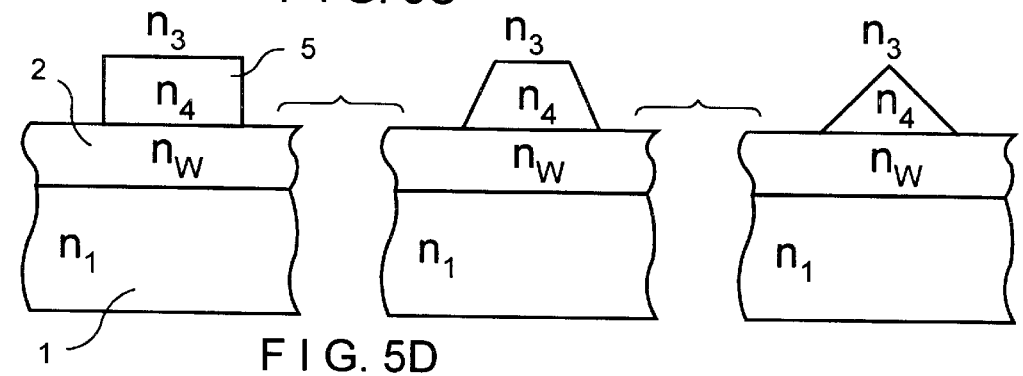
Figure 5E:
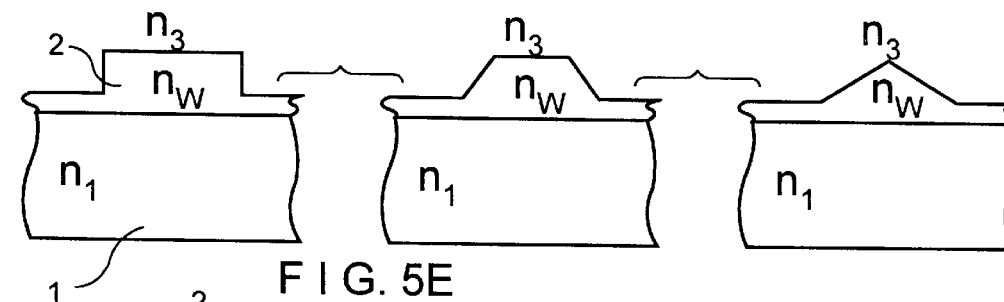
Figure 5F:
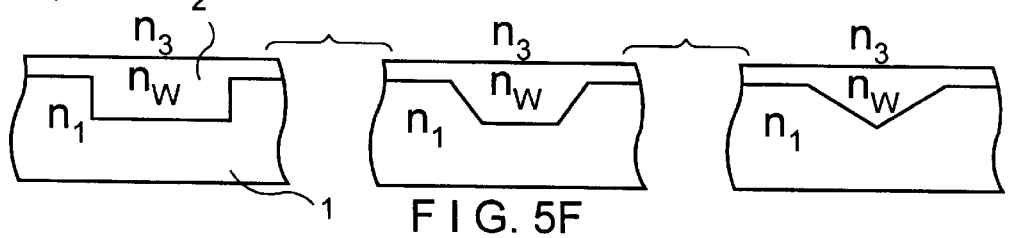

FIG. 5a–5f possible cross-sectional shapes of the SOWCW in or on a substrate material:

FIG. 5a shows the waveguides 2 embedded in substrate material 1 as a rectangular, trapezoidal, or triangular groove, FIG. 5b shows a waveguide 2 buried in substrate material 1, FIG. 5c shows the waveguide 2 placed onto substrate material 1 as a rectangular, trapezoidal, or triangular channel, FIG. 5d shows waveguides 2 with strip-like overlay where a rectangular, trapezoidal, or triangular strip 5 ensures lateral guidance of the light (ridge guide), FIG. 5e shows rib waveguides, and FIG. 5f shows inverted rib waveguides.

For all examples in FIGS. 5a–5f, the optical parameters will be set such that a SOWCW is created as explained in the descriptions in FIGS. 3 and 4 for the event of Rb:KTP.

Figure 6:
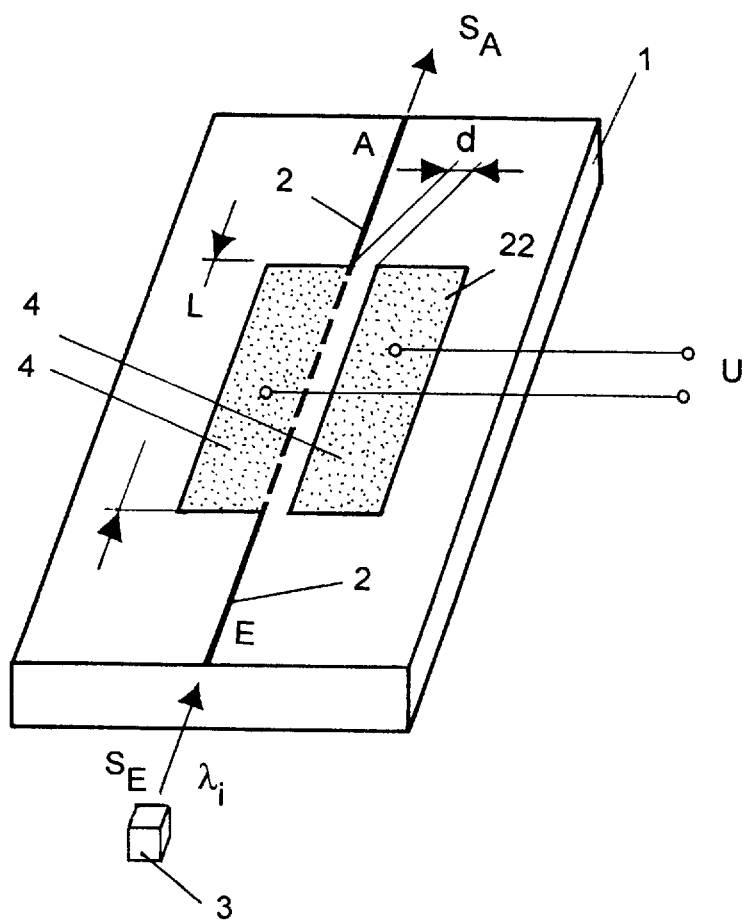
FIG. 6: Rb:KTP-SOWCW complete with phase modulator.

FIG. 6 shows the application of a SOWCW according to the invention with an electrode structure 4 for phase-modulating the light guided in SOWCW 2. The possibility of light modulation is met by the use of a substrate material which allows an option for influencing the phase of an input light signal. The input light signal is light of a wavelength λ or several discrete wavelengths $\lambda_i$ and/or one or several wavelength ranges $\Delta\lambda_i$.

By utilizing its high linear electro-optical coefficients, KTiOPO₄ offers the possibility of using electro-optical phase modulation. On a KTP substrate 1, the SOWCW 2 and electrodes 4 are arranged such that an electro-optical modulator is formed. Light from a light source 3 will be coupled into the light input E of the SOWCW 2. A voltage U applied to the electrodes 4 controls the phase of the light available at light output A for farther use. The SOWCW has the property of guiding, in single-mode, light from a wide spectrum range ($\Delta\lambda > 130$ nm, but applies to visible light only).

The SOWCW in FIG. 6 was fabricated in a Z-cut potassium titanyl phosphate substrate material (KTiOPO$_4$, KTP) by ion-exchange (rubidium against potassium). To be able to use the highest coefficient $r_{333}$ of the linear electro-optical tensor $r_{ijk}$, an electrode arrangement according to FIG. 6 is required, where, on the substrate surface, a first electrode will be applied flat next to the waveguide groove, and a second electrode overlapping the SOWCW 2.

By means of the voltage U applied to the electrodes, components of an electric field $E_Z$ will be generated in Z direction (Z=crystallographic Z axis, corresponds to the y direction in FIG. 3) in the waveguide region.

According to the following equations $$\Delta \frac{|1|}{\left|n\frac{2}{ij}\right|} = \sum_{k=1}^{3} rijkEk,$$

and $$\Delta\phi = \frac{2\pi}{\lambda}(\Delta Neff)L$$

these effect a phase shift that can be described as follows:

$$|\Delta\phi_i| \approx \frac{\pi}{\lambda_i} r_{333}(Neff, z)^3 \frac{U}{d} \Gamma L,$$

where $r_{333}$ is the linear electro-optical coefficient for Z-polarized light, and with an electric field in Z direction, the overlap factor $\Gamma$ between the electric field and the guided optical mode in the channel waveguide, the electrode distance d, and the active electrode length L.

Furthermore, the following holds in the channel waveguide $$\Delta n_{33} \approx \Delta N_{eff,Z}.$$

For a given control voltage U, the phase shift $\Delta\psi_i$ will be different for different wavelengths $\lambda_i$.

In a first instance, light of a discrete wavelength $\lambda_1$ will be coupled into the light input E of the SOWCW 2. This light will be phase-modulated. The effect corresponds to that in a known channel waveguide.

In a second instance, at least two discrete wavelengths $\lambda_1$ and $\lambda_2$ will be coupled into the input E of the SOWCW 2. According to the modulation voltage applied, the phase shift $\Delta\psi_1$ will be unequal to the phase shift $\Delta\psi_2$ due to the relation stated above. But the SOWCW 2 does not lose its characteristic of guiding light in single-mode. Against the background of the technical state of the art today, this modulation will be possible up to and including frequencies in the GHz range. The control voltage U for complete through modulation will be between 0 and approximately 4 volts for electrode lengths within the millimeter range and electrode distances within the $\mu$m range.

FIG. 7a shows a general illustration of the technically relevant wavelength range for single-mode wave guidance in an SOWCW according to claim 1. Technically relevant signifies that the effective refractive index $N_{eff}$ must be at least $5\times10^{-5}$ above $n_s$, where $n_s$ designates the value of substrate index $n_1$ or superstrate index $n_3$, whichever is the higher, to ensure a sufficiently low waveguide attenuation, e.g. 1 dB/cm. To each given wavelength in the range between $\lambda_1$ and $\lambda_1+\Delta\lambda$, one and only one effective refractive index, i.e. the effective refractive index of fundamental mode $N_{00}$ can be allocated. The single-mode range will be determined by the efficient oscillation build-up, from a technical point of view, of fundamental mode $N_{00}$ at wavelength $\lambda_1+\Delta\lambda$ on the one hand, and by the efficient oscillation build-up, from a technical point of view, of the first mode in lateral direction $N_{01}$ or of the first mode in depth direction $N_{10}$ at wavelength $\lambda_1$ on the other hand. The values of $\lambda_1$ and $\lambda_1+\Delta\lambda$ are determined by the geometric and substance parameters of the waveguide and the media surrounding the waveguide. In principle, the minimum value of the usable wavelength $\lambda_{min}$ and the maximum value of the usable wavelength $\lambda_{max}$ will be determined by the transmission range of the materials used. Thus, for instance, $\lambda_{min}$ is approximately 350 nm and $\lambda_{max}$ approximately 4 $\mu$m for the crystalline material KTP.

FIG. 7b shows the single-mode transmissible wavelength ranges $\Delta\lambda$ of the channel waveguide according to the current state of the art, consisting of Ti:LiNbO$_3$, and the SOWCW (Rb:KTP) according to this invention, as a function of wavelength $\lambda$. The calculation of the effective refractive indices, upon which the determination of the single-mode transmissible wavelength ranges $\Delta\lambda$ is based, was done by means of the effective index method analog to FIGS. 2 and 4, where the calculation for the reference wavelength $\lambda_1=500$ nm was carried out. Based on the known wavelength dependence (dispersion) of the refractive index increase $n_2-n_1$ required for wave guidance, as well as on the wavelength dependence (dispersion) of substrate index $n_1$, and starting from the concrete reference wavelength $\lambda_1$, first waveguide depth t, then waveguide width a (until respective oscillation build-up of the first mode), and finally wavelength $\lambda$ (until fundamental mode $N_{00}$ had disappeared), were varied in this calculation.

The upper limit of the single-mode transmissible wavelength range will be the wavelength $\lambda_1+\Delta\lambda$ where the effective refractive index of the channel waveguide is $5\times10^{-5}$ above the substrate index $n_1$. The size of the single-mode transmissible wavelength range will depend on the respective reference wavelength $\lambda_1$. From the state of the art, corresponding to the standard titanium-indiffused channel waveguide in lithium niobate (Ti:LiNbO$_3$), it can be deduced that the size of the single-mode transmissible wavelength range $\Delta\lambda$ must meet the inequation $$\Delta\lambda > 0.48 \times \lambda - 85 \text{ nm}$$

(where $\lambda$ and $\Delta\lambda$ are to be stated in nm), in order to characterize an SOWCW—such as for instance the rubidium-potassium ion-exchanged channel waveguide in KTP (Rb:KTP).

The region in which $\Delta\lambda$ corresponds to an SOWCW has been marked in grey in FIG. 7b. If necessary, the single-mode guidable wavelength range will be restricted by the optical transmission range limits of the substrate material, that is if e.g. $\lambda_1 < \lambda_{min}$ or $\lambda_1+\Delta\lambda > \lambda_{max}$ (see FIG. 7a). Using suitable substrate or waveguide materials, this inequation can also be applied to wavelengths greater or less than shown in FIGS. 7a and 7b.

FIG. 8 shows examples for using the SOWCW 2 in sensor applications. According to FIG. 8a, the absorbing effect of a measurement medium (gaseous, liquid, solid) on the evanescent field (located in the superstrate) of the wave guided in the SOWCW 2 is measured and evaluated. To this end, the surface of substrate material 1, which comes into contact with the medium, will be covered by buffer layer 7 (e.g. $SiO_2$) excepting only the interaction window area 6. In this way, the evanescent field will be accessible only in the interaction window area 6. Only in an area with a predefined length does the interaction window 6 leave the SOWCW 2 free. At light input E of the SOWCW 2, light will be coupled in. At light output A of the SOWCW 2, light influenced by the measurement medium will be available for evaluation. For example, a photometric measurement can be effected with a detector 8. The SOWCW 2 is characterized by guiding light components of different wavelengths $\lambda_i$ from a wide wavelength spectrum.

In contrast to known channel waveguides, the measurement wavelength can be adapted to the medium to be investigated, as well as the substance parameter to be investigated, across a comparatively very wide wavelength spectrum. Measurements can be made on the measurement medium immediately at the various wavelengths $\lambda_i$. Advantageously, the light components in the SOWCW can be modulated by an amplitude modulator (not shown here) corresponding to the SOWCW By absorption of the measurement medium itself or by a change in the surface dispersion, a change in waveguide attenuation is caused. Here, the fact is utilized that, with guided waves, a part of the electric or magnetic field distribution will be guided outside the channel waveguide itself (evanescent field). These field components are thus accessible from outside the channel waveguide. If an absorbing medium is on the channel waveguide, i.e. in the superstrate, then the evanescent field itself—depending on absorption—will be attenuated, or the surface dispersion of the channel waveguide will be changed by applying a medium onto interaction window 6, which medium is not necessarily absorbing. Both will cause the waveguide attenuation to change, and this can be measured by means of the photometer test setup. In addition, the propagation constant of the guided mode will change due to the influence of the measurement medium; this can be measured by means of an interferometer test setup, e.g. using a Michelson Interferometer according to FIG. 8*b*. The substrate 1 with the SOWCW 2 is located in the light path between beam splitter 10 and reflector 9. A further implementation variant is that the interaction window 6 is coated with a substance reacting to physical, chemical, or biological external influences, which substance, when acted upon by such external influences, will influence the behavior of the guided light and/or the waveguide itself.

According to FIG. 8*c*, the reflectivity on the channel waveguide endface B of the SOWCW 2 will be determined as a measurement quantity at the sensor. The following variants are provided:

a) the measurement medium will itself act as a reflector 9, and it is in contact with or at a distance from the endface of the waveguide B, or b) the reflector 9 uses a reactive substance as its reflective coating, or the reactive substance is itself the reflector 9, where the reactive substance changes the reflectivity in dependence on the surrounding measurement medium, or c) the reflector 9 is located at a distance from the endface of the waveguide B, and the measurement medium is located between the endface of the waveguide B and the reflector 9.

If the distance is short, e.g. within a range of some micrometers only, additional beam forming devices will not be necessary.

With this setup, light of at least one wavelength $\lambda_i$—from the possible wide wavelength spectrum—will be coupled into the light input E of the SOWCW 2. On light output A, corresponding to the light input E, light components of the reflected and/or fluorescence light, influenced by the measurement medium, will be measured via a beam splitter 10. The integrated-optical implementation of measurement setups according to FIG. 8 favors a miniaturized structure and applications in microsystem technology. The smallest sample quantities can be used and measurements carried out with an extremely high measurement sensitivity, as the interaction window 6 must only be just a fraction wider than the SOWCW 2, and the length of the interaction window can be within the millimeter range. By means of the measurement setups, all physical, biological, and chemical quantities of gases, liquids, and solids influencing the behavior of the guided light or the behaviour of the SOWCW 2 itself can be measured. And for a given measurement setup, containing an SOWCW, wavelengths and wavelength ranges can be freely selected from a wide wavelength spectrum.

While the foregoing description and drawings represent the preferred embodiments of the present invention, it will be obvious to those skilled in the art that various changes and modifications may be made therein without departing from the true spirit and scope of the present invention.

REFERENCE AND FORMULAE SYMBOLS

1 substrate
2 channel waveguide (SOWCW)
3 light source
4 electrodes
5 strip-like overlay (strip)
6 interaction window
7 buffer layer
8 detector
9 reflector
10 beam splitter
11 titanium strip
$\lambda$ wavelength
$\lambda_1$ shortest single-mode guidable wavelength
$\lambda_i$ discrete wavelength (single wavelength)
$\lambda_{min}$ minimum wavelength of the optically transmitting range of a substrate material
$\lambda_{max}$ maximum wavelength of the optically transmitting range of a substrate material
$\Delta\lambda$ wavelength range for the single-mode guiding of the channel waveguide
$\psi$ phase
$\Delta\psi$ phase shift
$\Delta\psi_i$ phase shift of the wavelength $\lambda_i$
E light input
A light output
B endface of the waveguide
U control voltage
$S_E$ input signal
$S_A$ output signal
a width of the stricture
t depth (height) of the structure
w starting width of the titanium strip for the indiffusion
L active electrode length
d electrode spacing
x coordinate axis in lateral direction across the channel waveguide
y coordinate axis in depth direction across the channel waveguide
z coordinate axis in propagation direction of the light in the channel waveguide
$D_x$, $D_y$, $D_z$ diffusion constants
$N_{00}$ effective refractive index of the fundamental mode of the channel waveguide $N_{01}$ effective refractive index of the first mode in lateral direction of the channel waveguide $N_{10}$ effective refractive index of the first mode in depth direction of the channel waveguide $N_{eff}$ effective refractive index of the channel waveguide mode $N_{eff,z}$ effective refractive index of the Z-polarized mode of the channel waveguide $a_x$ intermediate value of a length in x direction $a_y$ intermediate value of a length in y direction $t_d$ diffusion time $n_w$ distribution of the refractive index in the waveguiding region $n_w = f(x,y)$ $n_1$ refractive index of the substrate $n_2$ refractive index of the waveguiding region at the surface $n_3$ refractive index of the superstrate $n_4$ refractive index of the strip-like overlay (strip)

$n_s$ refractive index of the substrate if $n_1 > n_3$ or refractive index of the superstrate if $n_3 > n_1$ $n_{ij}$ component of the refractive index in a crystalline material $$\frac{d(n_2 - n_s)}{d\lambda} \geq 0$$

wavelength dependence (dispersion) of the increase of the refractive index necessary for guidance of the optical wave $E_k$ electric field strength component relative to crystal direction k $E_{elektr.}$ external electrical field $r_{ijk}$ component of the linear electro-optical tensor for the given material $\Gamma$ overlap factor between the external electrical field of the electrodes and the optical field of the guided mode Z crystallographic Z-axis X crystallographic X-axis

What is claimed is:

1. A channel waveguide comprising:

a surface substrate material;

a channel-shaped structure fabricated in or on said substrate material by a process for changing the refractive index of the substrate material for providing a channel waveguide or by applying a suitable material for providing a channel waveguide on the substrate material having geometric and substance parameters, said parameter being set in dependence of wavelength ranges to be transmitted in the UV, visible and/or IR regions, so that in relation to wavelength ($\lambda$) of guided light in a vacuum the width of the wavelength range for single-mode light guidance is provided by the equation $$\Delta\lambda \geq 0.48 \times \lambda - 85 \text{ nm}$$

with $\lambda$ and $\Delta\lambda$ in nm and defining $\lambda_1 = \lambda$ for a given channel waveguide, is ensured, that is to each given wavelength ($\lambda$) in the range between $\lambda_1$ and $\lambda_1 + \Delta\lambda$ one and only one refractive index, i.e. the effective refractive index of the fundamental mode ($N_{00}$), can be allocated, and the single-mode range will be determined by the efficient oscillation build-up, from a technical point of view, of fundamental mode $N_{00}$ at wavelength $\lambda_1 + \Delta\lambda$ on the one hand, and by the efficient oscillation build-up, from a technical point of view, of the first mode in lateral direction ($N_{01}$) or of the first mode in depth direction ($N_{10}$) at wavelength $\lambda_1$ on the other, and with transmission at a technically sufficient degree of effectiveness signifying that the effective refractive index $N_{eff}$ of the mode guided in the channel waveguide must be at least $5 \times 10^{-5}$ above the refractive index of surrounding material $n_s$, where $n_s$ designates the value of substrate material index $n_1$ or superstrate material $n_3$, whichever is higher, and with the minimum possible value of the usable wavelength ($\lambda_{min}$) and the maximum possible value of the usable wavelength ($\lambda_{max}$) being determined by the transmission range of the materials used, said channel waveguide being defined as a single-mode integrated-optical wideband channel waveguide (SOWCW).

2. The channel waveguide according to claim 1 wherein the channel-shaped structure is narrowly delimited in two dimensions vertical to the propagation direction of the light.

3. The channel waveguide of claim 1 wherein the channel-shaped structure is narrowly delimited in two dimensions vertical to the propagation direction of the light (z axis) and where there is a wavelength dependence (dispersion)

$$\frac{d(n_2 - n_s)}{d\lambda} \geq 0$$

where $n_s = n_1$; if $n_1 > n_3$ or $n_s = n_3$; if $n_3 > n_1$ of the refractive index increase ($n_2 - n_s$) necessary for wave guidance.

4. The channel waveguide according to claim 3, where a rubidium-potassium ion-exchanged channel waveguide is embedded in Z-cut potassium titanyl phosphate ($KTiOPO_4$, KTP), and diffusion predominantly occurs in depth direction only, thus meeting the lateral restriction requirement, and the channel waveguide in KTP shows only a weak dispersion of the refractive index increase necessary for wave guidance in the required wavelength range, and where an electro-optical modulation of the light is possible using the substrate material KTP with its high linear electro-optical coefficients.

5. The channel waveguide according to claim 1 wherein the channel-shaped structure is not narrowly delimited in two dimensions vertical to the propagation direction of the light (z axis), and where there is a wavelength dependence (dispersion)

$$\frac{d(n_2 - n_s)}{d\lambda} \geq 0$$

where $n_s = n_1$; if $n_1 > n_3$ or $n_s = n_3$; if $n_3 > n_1$ of the refractive index increase ($n_2 - n_s$) necessary for wave guidance.

6. The channel waveguide according to claim 1 consisting of rubidium$\leftrightarrow$potassium ion-exchanged potassium titanyl phosphate ($KTiOPO_4$, KTP), where the geometric and substance parameters can be set so that a single-mode operation of the channel waveguide within the wavelength range $$\Delta\lambda > 0.48 \times \lambda - 85 \text{ nm}$$

(with $\lambda$ and $\Delta\lambda$ being stated in nm) is ensured, with the minimum possible value of the usable wavelength ($\lambda_{min}$ approx. 350 nm) and the maximum possible value of usable wavelength ($\lambda_{max}$ approx. $4\mu$) being determined by the optical transmission range of $KTiOPO_4$, and with, in particular, the wavelength range ($\Delta\lambda$) to be transmitted in single-mode in the visible light wavelength spectrum comprising a wavelength range greater than 350 nm, and with the SOWCW being so defined as a single-mode white light channel waveguide.

7. The channel waveguide according to claim 1 wherein the cross-section of the SCWCW (2) is limited by two areas parallel to the y-z plane (y'-z' plane, y"-z" plane) and one plane (x'-z' plane) parallel to the surface plane (x"-z" plane), which is located by an element either below (depth t) or above the surface plane (refractive index groove in FIG. 3 or refractive index step).

8. A channel waveguide in or on a surface-type substrate material, said channel waveguide comprising:

a channel-shaped structure, said channel-shaped structure providing effective refractive indices $N_{eff}$ dependent on wavelength and on different transmission modes of said waveguide, and said channel-shaped structure providing single-mode transmission for each wavelength in a wavelength range of $$\Delta\lambda \geq 0.48 \times \lambda - 85 \text{ nm}$$

and defining $\lambda_1 = \lambda$ for a given channel waveguide wherein $\lambda_1$ and $\Delta\lambda$ are defined by $$N_{eff}(\lambda_1 + \Delta\lambda) = 5 \times 10^{-5} + n_s$$

for a fundamental mode ($N_{00}$), where $n_s$ is the highest value of the refractive indices of the materials surrounding the waveguide, and $$N_{eff}(\lambda_{1(01)}) = 5 \times 10^{-5} + n_s$$

for a first mode in lateral direction ($N_{01}$), wherein $\lambda_{1(01)}$ is the wavelength of the efficient oscillation build-up of the first mode in the lateral direction ($N_{01}$), and $$N_{eff}(\lambda_{1(10)}) = 5 \times 10^{-5} + n_s$$

for the first mode in depth direction ($N_{10}$), wherein $\lambda_{1(10)}$ is the wavelength of the efficient oscillation build-up of the first mode in the depth direction ($N_{10}$), and $$\lambda_1 = \lambda_{1(01)} \text{ if } \lambda_{1(01)} \geq \lambda_{1(01)}$$

or $$\lambda_1 = \lambda_{1(01)} \text{ if } \lambda_{1(01)} < \lambda_{1(01)}.$$

* * * * *